US011940067B2

(12) United States Patent
Larsen

(10) Patent No.: US 11,940,067 B2
(45) Date of Patent: Mar. 26, 2024

(54) REMOTE PROCESS EQUIPMENT BOLT FLANGE JOINT OPENING AND CLOSING SYSTEM AND METHOD OF USE

(71) Applicant: Kevin Larsen, Mesa, AZ (US)

(72) Inventor: Kevin Larsen, Mesa, AZ (US)

(*) Notice: Subject to any disclaimer, the term of this patent is extended or adjusted under 35 U.S.C. 154(b) by 526 days.

(21) Appl. No.: 17/204,390

(22) Filed: Mar. 17, 2021

(65) Prior Publication Data
US 2021/0301956 A1 Sep. 30, 2021

Related U.S. Application Data

(60) Provisional application No. 63/000,336, filed on Mar. 26, 2020.

(51) Int. Cl.
B25B 5/00 (2006.01)
B25B 27/16 (2006.01)
F16L 23/036 (2006.01)
F16L 33/16 (2006.01)

(52) U.S. Cl.
CPC ............ F16L 23/036 (2013.01); B25B 27/16 (2013.01); F16L 33/16 (2013.01)

(58) Field of Classification Search
CPC .... B25B 1/02; B25B 1/04; B25B 1/14; B25B 5/00; B25B 5/061; B24D 15/08
See application file for complete search history.

(56) References Cited

U.S. PATENT DOCUMENTS

| 3,724,836 | A | * | 4/1973 | Sendoykas | B25B 5/062 269/94 |
| 4,150,477 | A | * | 4/1979 | Orr | B25B 27/16 29/525.08 |
| 5,129,136 | A |  | 7/1992 | Richardson | |
| 5,668,328 | A | * | 9/1997 | Steber | F15B 11/028 73/862.23 |
| 6,357,230 | B1 |  | 3/2002 | A'Hearn et al. | |

(Continued)

OTHER PUBLICATIONS

Larsen, Kevin, Remote Process Equipment Bolt Flange Joint Opening and Closing System and Method of Use, Patent Cooperation Treaty Application Serial No. PCT/US21/23396, Filed on Mar. 22, 2021, International Search Report and Written Opinion dated Jun. 8, 2021.

Primary Examiner — Lee D Wilson
(74) Attorney, Agent, or Firm — Schmeiser, Olsen & Watts LLP

(57) ABSTRACT

A system for remotely opening and closing a process equipment bolt flange joint may include a hydraulic cylinder actuator assembly for attaching to the flanges of a bolt flange joint to open and close the joint by operation of a remote hydraulic pump. More than one actuator assembly may be evenly spaced around the flange joint, to ensure even distribution of force around the joint. The system may have an accumulator for receiving hydraulic fluid expelled from the hydraulic cylinder during extension and to force hydraulic fluid back into the cylinder to close the flange joint upon pressure release at the pump. A drop trigger may be used to release hydraulic pressure at the pump for emergencies. The system may include a video camera for viewing the joint on a display. The components may be stored and transported on a mobile cart. A method of use is also disclosed.

14 Claims, 15 Drawing Sheets

(56) References Cited

U.S. PATENT DOCUMENTS

| | | | |
|---|---|---|---|
| 2005/0035515 A1* | 2/2005 | Hixon, Jr. | ............... B25B 5/087 |
| | | | 269/32 |
| 2007/0012038 A1 | 1/2007 | Bitter | |
| 2009/0152784 A1* | 6/2009 | Yonezawa | ............... B25B 5/062 |
| | | | 269/27 |
| 2016/0039076 A1* | 2/2016 | Voss | ..................... F16L 23/003 |
| | | | 29/244 |
| 2018/0229290 A1 | 8/2018 | Frenken et al. | |
| 2021/0301956 A1* | 9/2021 | Larsen | ................... F16L 33/16 |

* cited by examiner

REMOTE PROCESS EQUIPMENT BOLT FLANGE JOINT OPENING AND CLOSING SYSTEM AND METHOD OF USE

CROSS REFERENCE TO RELATED APPLICATION

This application claims priority to U.S. Provisional Patent Application to Kevin Larsen entitled "REMOTE PROCESS EQUIPMENT BOLT FLANGE JOINT OPENING AND CLOSING SYSTEM AND METHOD OF USE," serial number 63000336, filed Mar. 26, 2020, the disclosures of which are hereby incorporated entirely herein by reference.

BACKGROUND OF THE INVENTION

Technical Field

This invention relates generally to process equipment bolt flange joint spreaders and, more particularly, to a system for remotely spreading and closing a process equipment bolt flange joint.

State of the Art

Pipes that are part of a system of process equipment, such as at an oil refinery, for example, are commonly connected by a bolt flange joint. It is often necessary to open a process equipment bolt flange joint for maintenance or repairs to a bolt flange joint assembly. For example, it may be necessary to open the bolt flange joint in order to remove and replace a flange gasket, to clean or clear a pipe, or to replace a piece of equipment connected to a piping system at the flange joint.

Opening and spreading a bolt flange joint is typically performed by first removing the flange joint bolts and then using a spreading device to spread the flange joint apart. The flange joint may be spread by driving a wedge into the joint, using a hammer, wherein the wedge is made of a soft metal or other suitable material to minimize risk of creating a spark. This method carries a risk of marring the conjoining flange joint surfaces. Alternatively, a variety of flange spreading tools have been devised that may use mechanical or electromechanical means to spread a flange joint with significant spreading force.

Thousands of bolted flange joint assemblies are opened and closed every day. Opening and spreading a bolt flange joint, by conventional means, is inherently dangerous to workers performing the operation and may carry significant risk of loss of materials in the pipe system or damage to process equipment. Although pipe systems are normally evacuated, drained, and/or depressurized, before bolt flange joints are opened, it is not always possible to avoid residual material in a pipe system. Liquids and/or gases carried in a pipe system may be toxic or flammable or may be at extremely high or low temperature. Some gases in pipe systems may be fatal if breathed in by a worker. In some cases, the pipe system may still be pressurized. Workers performing bolt flange joint spreading procedures are required to wear personal protective equipment because performing such procedures using conventional tools requires them to be in close proximity to the bolt flange joint. In many cases, such workers may be at risk of significant injury or death such as from fire, explosion, pressurized blast, or contact with toxic, burning, or freezing liquids and/or gases escaping a bolt flange joint, when performing bolt flange joint spreading procedures using conventional tools. Furthermore, conventional tools for spreading a bolt flange joint do not provide a means for quickly closing the joint again, should the need arise.

Besides the risk of injury or death to workers, conventional bolt flange joint spreading procedures also carry risk of potentially catastrophic losses due to spillage and other loss of materials from the pipes, damage to piping systems and other process equipment, lost productivity due to loss of equipment and downtime during repairs and replacement of equipment, as well as expensive and time-consuming cleanup and mitigation procedures, often at a cost of millions of dollars per incident.

Accordingly, what is needed is an improved system for spreading and closing a bolt flange joint that minimizes risk of injury or death to workers and minimizes risk of loss of materials from and damage to process equipment.

SUMMARY OF THE INVENTION

The present invention relates to process equipment bolt flange joint spreaders and, more particularly, to a system for remotely spreading and closing a process equipment bolt flange joint.

A system for remotely spreading and closing a process equipment bolt flange joint may comprise an actuator assembly and a hydraulic pump coupled to the actuator assembly via hydraulic fluid lines. The hydraulic fluid lines may be of sufficient length as to allow the hydraulic pump to be located remotely from the actuator assembly. In operation, the actuator assembly may be operatively coupled to a bolt flange joint to spread and close the joint in response to operation of the hydraulic pump.

Some embodiments of a system may comprise a plurality of actuator assemblies, wherein, in operation, more than one actuator assembly may be evenly spaced around the flange joint, to work in concert with each other to simultaneously open or close the joint, thus, ensuring even distribution of force from the actuator assemblies around the flange joint, while in use.

The hydraulic cylinder may be operated remotely by operation of a hydraulic pump coupled thereto by hydraulic fluid lines. In some embodiments, a system may further comprise a wheeled cart or other mobile storage device for convenient storage, holding, and transport of the hydraulic pump, and to hold all of the other components of the system for convenient storage, and/or transport, of the system while not in use.

In some embodiments, a system may further comprise an accumulator coupled thereto, by a hydraulic fluid line, for receiving hydraulic fluid expelled from the hydraulic cylinder during opening of the flange joint. In operation of such embodiments, as a user operates the hydraulic pump to extend the hydraulic cylinder to spread the flanges of a bolt flange joint, hydraulic fluid expelled from the hydraulic cylinder is stored under pressure in the accumulator. The user may release the pressure of the hydraulic pump, whereupon the accumulator acts to force hydraulic fluid back into the cylinder to close the flange joint again.

In some embodiments, the hydraulic pump may be equipped with a drop trigger operationally coupled thereto for releasing the hydraulic pump pressure, allowing the cylinder to quickly retract in response to pressure from the accumulator.

Some embodiments of a system may further comprise a video camera coupled to a display. In operation, the video camera may be placed near the bolt flange joint and the display may be preferably coupled to the mobile storage device, or otherwise disposed near the hydraulic pump for viewing by the user. The user may thereby observe the condition of the bolt flange joint, including any discharge from the joint when the joint is opened, by viewing an image of the joint on the display.

In some embodiments, the system may further comprise a controller coupled to at least one sensor, wherein the at least one sensor is any of a variety of sensors for sensing a condition of or at the bolt flange joint. The controller may control the hydraulic pump to open or close the flange joint in response to feedback signals received from the at least one sensor.

A method of using a system for remotely spreading and closing a process equipment bolt flange joint is also disclosed.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in conjunction with the Figures, wherein like reference numbers refer to similar items throughout the Figures, and:

DETAILED DESCRIPTION OF EMBODIMENTS OF THE INVENTION

As discussed above, embodiments of the present invention relate to process equipment bolt flange joint spreaders and, more particularly, to a system for remotely spreading and closing a process equipment bolt flange joint.

Figure 1:
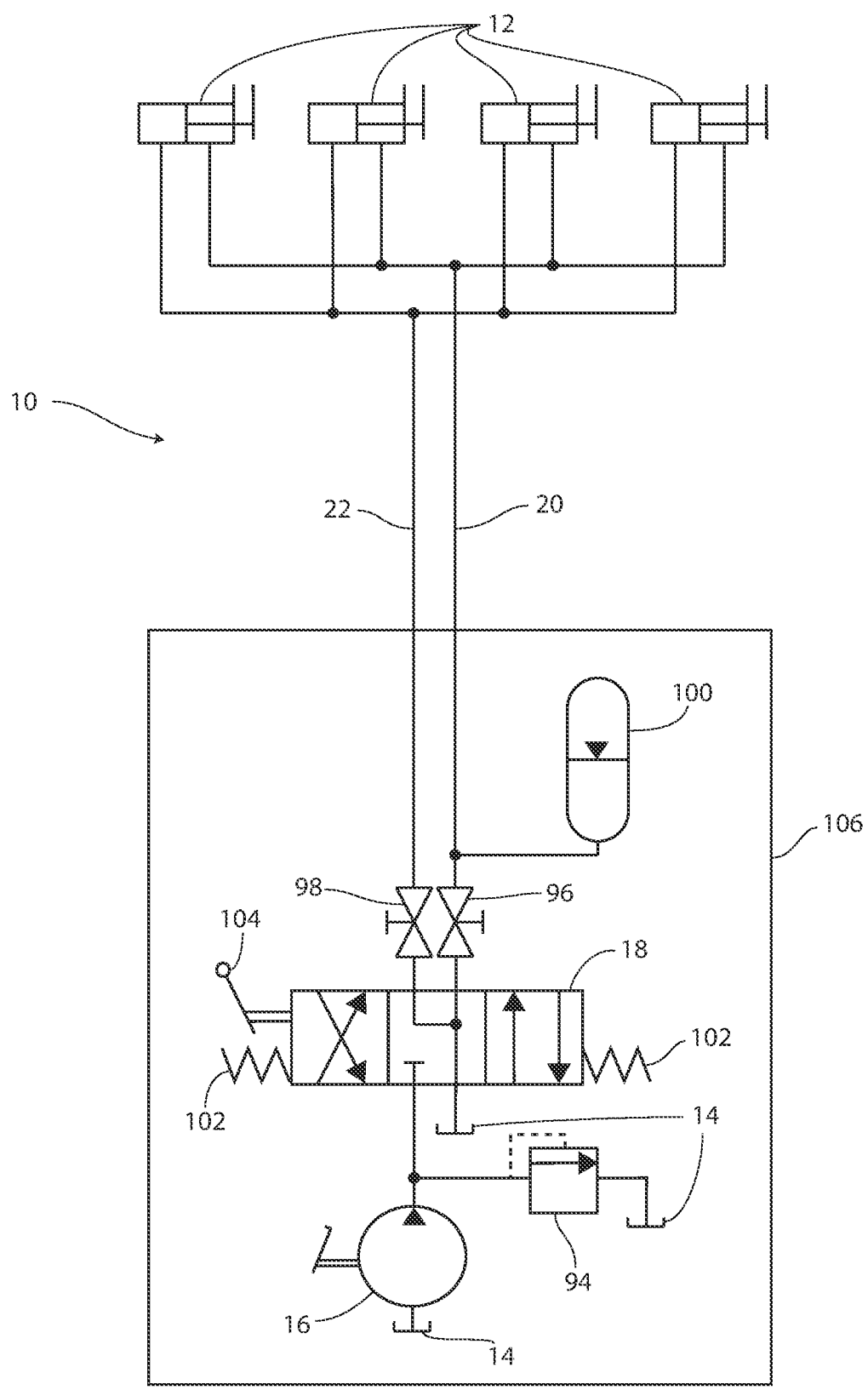
FIG. 1 is a diagrammatic view of a system for remotely opening and closing a process equipment bolt flange joint, according to an embodiment.
Figure 2:
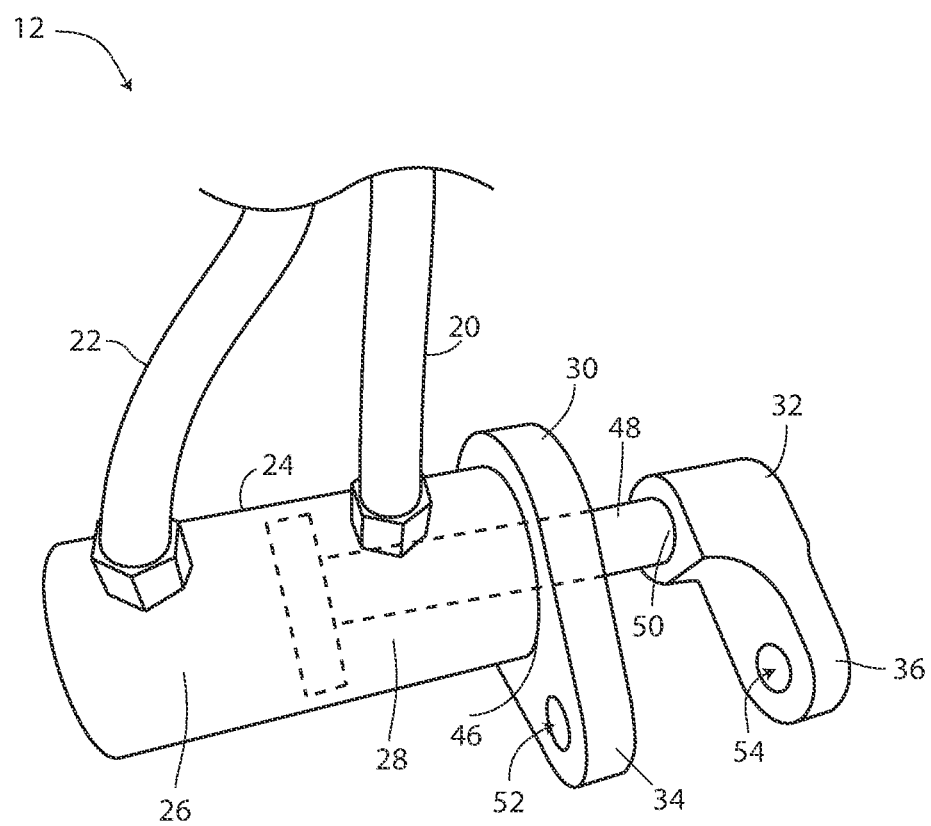
FIG. 2 is a perspective view of an actuator assembly of a system for remotely opening and closing a process equipment bolt flange joint, according to an embodiment.

Referring to the drawings, as shown in FIGS. 1 and 2, embodiments of a system 10 for remotely spreading and closing a process equipment bolt flange joint 38 may comprise at least one actuator assembly 12; a fluid reservoir 14; a hydraulic pump 16 in fluid communication with the fluid reservoir 14; a control valve 18 in fluid communication with the hydraulic pump 16 and also in fluid communication with the fluid reservoir 14; a closing side hydraulic line 20 coupled between and in fluid communication with the control valve 18 and a closing side 28 of a double-acting piston cylinder 24 of the at least one actuator assembly 12; and an opening side hydraulic line 22 coupled between and in fluid communication with the control valve 18 and an opening side 26 of the double-acting piston cylinder 24. In some embodiments, the control valve 18 may be changeable between a closing position, in which hydraulic fluid is flowable between the pump 16 and the closing side hydraulic line 20, and an opening position, in which hydraulic fluid is flowable between the pump 16 and the opening side hydraulic line 22.

Some embodiments may comprise a plurality of actuator assemblies 12, wherein each of the closing side hydraulic line 20 and the opening side hydraulic line 22 is split into multiple branches to accommodate each of the plurality of actuator assemblies 12. For example, the embodiment shown in FIG. 1 comprises four actuator assemblies 12. The number of actuator assemblies 12 may be dependent on the number of bolts 44 of a bolt joint 38 to which the system 10 is to be applied, as further described below. In embodiments of a system 10, having a plurality of actuator assemblies 12, each of the plurality of actuator assemblies 12 may be configured to operate simultaneously with, in concert with, and under the same hydraulic pressure as each of the other actuator assemblies 12 of the plurality of actuator assemblies 12.

Figure 4:
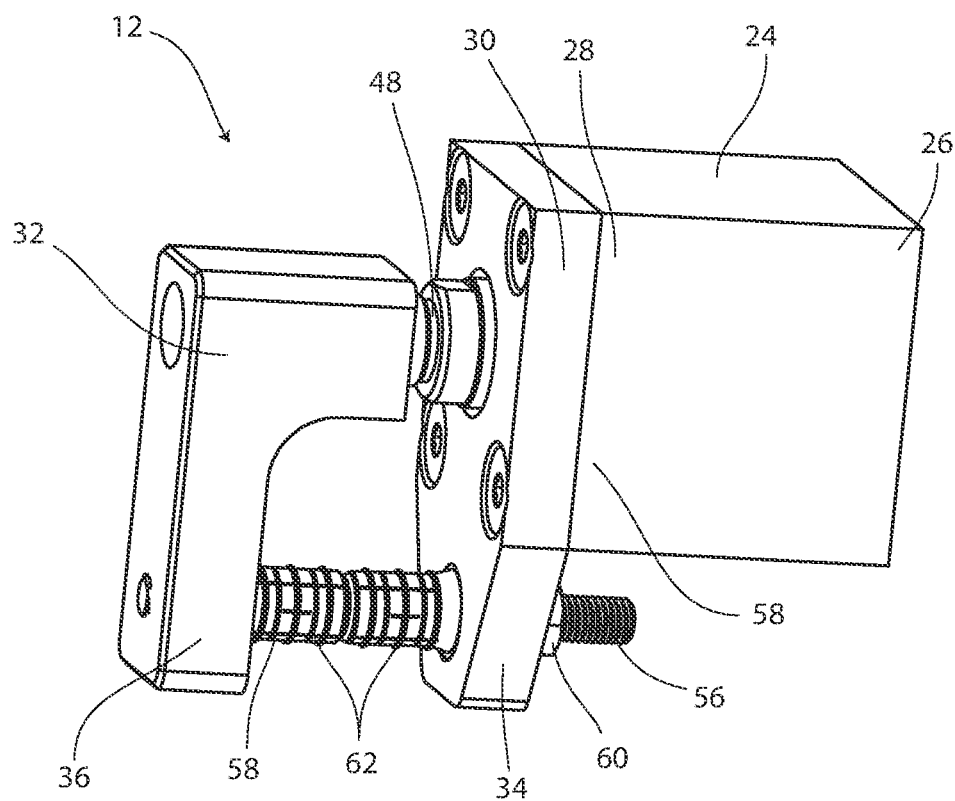
FIG. 4 is a perspective view of an actuator assembly of a system for remotely opening and closing a process equipment bolt flange joint, according to another embodiment.

Referring to FIGS. 2 and 4, an actuator assembly 12, of the present invention, may comprise a double-acting piston cylinder 24; a first clamping member 30 coupled to the double-acting piston cylinder 24 at a rod end 46 thereof; a second clamping member 32 coupled to a protruding end 50 of a rod 48 of the double-acting piston cylinder 24, wherein the first clamping member 30 comprises a first jaw portion 34 extending in a radial direction from a longitudinal axis of the rod 48 and the second clamping member 32 comprises a second jaw portion 36 extending in a radial direction from the longitudinal axis of the rod 48, wherein the first and second clamping members 30 and 32 correspond to each other, wherein the first jaw portion 34 and the second jaw portion 36 are configured to engage and to be coupled to a first flange 40 and a second flange 42 of a bolt flange joint 38, respectively.

Figure 5:
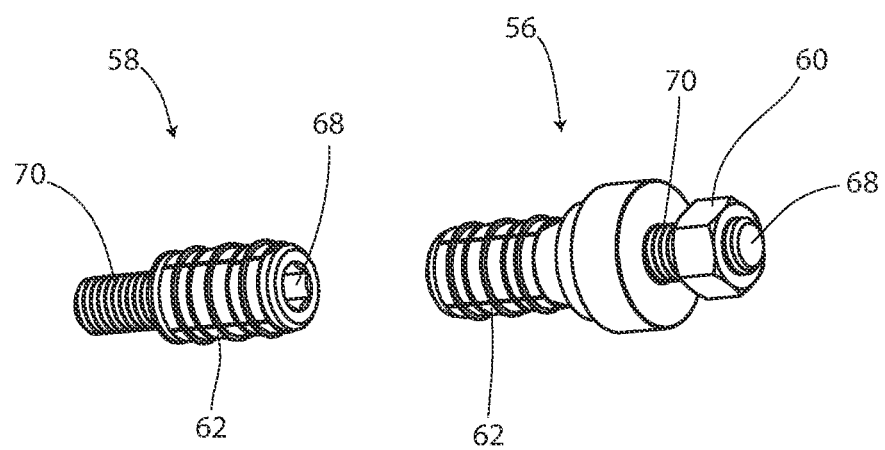
FIG. 5 is a perspective view of a first expansion bolt and a second expansion bolt of a system for remotely opening and closing a process equipment bolt flange joint in a closed configuration, according to an embodiment.
Figure 6:
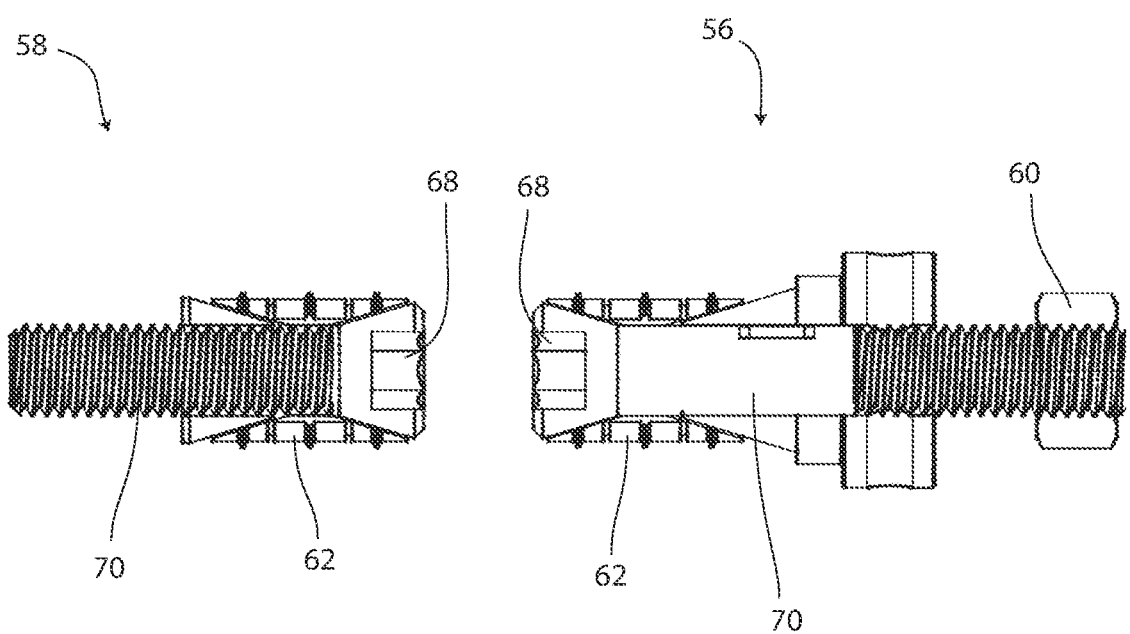
FIG. 6 is a section view of a first expansion bolt and a second expansion bolt of a system for remotely opening and closing a process equipment bolt flange joint in a closed configuration, according to an embodiment.

FIGS. 5 and 6 are a perspective view and a section view, respectively, of first and second expansion bolts 56 and 58, according to an embodiment. Referring to FIGS. 2 and 4, in some embodiments, an actuator assembly 12 may comprise a first expansion bolt aperture 52 through the first jaw portion 34 and a second expansion bolt aperture 54 through the second jaw portion 36, wherein longitudinal axes of the first and second expansion bolt apertures 52 and 54 are colinear and are parallel to a longitudinal axis of the rod 48. As shown in FIG. 4, a first expansion bolt 56 may be coupled through the first expansion bolt aperture 52, and a second expansion bolt 58 coupled through the second expansion bolt aperture 54. The expansion bolts 56 and 58 may be coupled through the expansion bolt apertures 52 and 54, for example, by inserting the bolts 56 and 58 through the respective expansion bolt apertures 52 and 54 and securing them with nuts 60. Alternatively, the expansion bolt apertures 52 and 54 may be threaded and sized for receiving the expansion bolts 56 and 58 threaded into the apertures 52 and 54. In some embodiments, the expansion bolts 56 and 58 may be integral to the jaw portions 34 and 36. Each of the first and second expansion bolts 56 and 58 may further comprise an expandable portion 62 extending inward from the respective jaw portion 34 or 36, wherein the expandable portion 62 is configured to be coupled within a bolt hole 64 of the respective flange 40 or 42 by friction between the expandable portion 62 and an inner surface 66 of the bolt hole 64 of the flange 40 or 42. The expandable portions 62 of the expansion bolts may be expandable, for example, by a user rotating a threaded bolt or screw device 68 through a main body 70 of the expansion bolt 56 or 58 in a first direction, and contractable by the user rotating the threaded bolt or screw device 68 in a reverse direction. In this manner, each of the first and second expansion bolts 56 and 58 may be securely and reversibly coupled within corresponding bolt holes 64 of the first and second flanges 40 and 42 of the flange joint 38, respectively, without marring, or even contacting, the inner conjoining surfaces of the flanges. In the embodiment shown in FIGS. 5 and 6, the expandable portions 62 expand in response to opposing wedge-shaped components being drawn together. However, this is not intended to be limiting. Any of a variety of expansion bolts, known now or in the future, may be used for securing jaw portions 34 and 36 to the inner surfaces 66 of corresponding bolt holes 64 of a flange joint 38.

Figure 3:
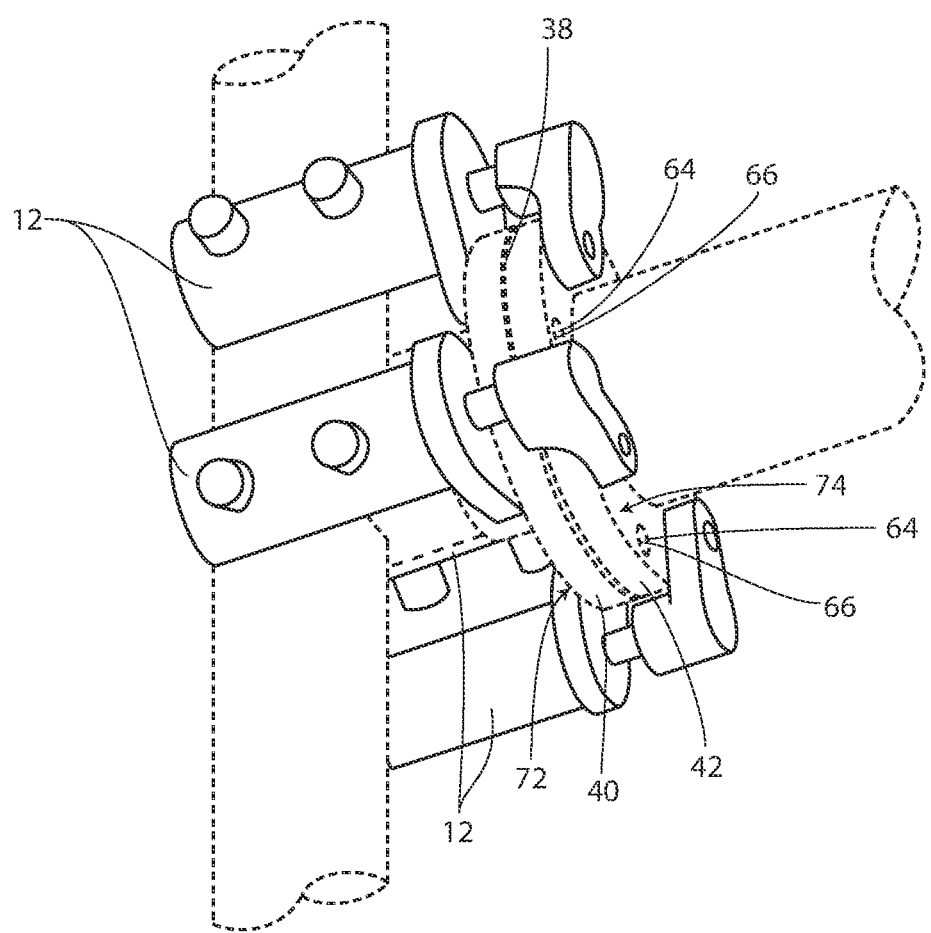
FIG. 3 is a perspective view of four actuator assemblies, of a system for remotely opening and closing a process equipment bolt flange joint, coupled to a process equipment bolt flange joint, according to an embodiment.

For example, in a practical application, as shown in FIG. 3, in order to couple an actuator assembly 12, of the present invention, to a process equipment bolt flange joint 38, a user may first remove a single bolt 44 from a process equipment bolt flange joint 38, thereby exposing a bolt hole 64 thereof. The user may couple a first expansion bolt 56 within the first expansion bolt aperture 52 of the first jaw portion 34 and the second expansion bolt 58 within the second expansion bolt aperture 54 of the second jaw portion 36. The user may then position the actuator assembly 12 such that the first jaw portion 34 engages a first outer surface 72 of the first flange 40 of the flange joint 38, and the second jaw portion 36 engages a second outer surface 74 of the second flange 42 joint 38, opposite the first jaw portion 34, at the location of the removed single bolt 44. In doing so, the expandable portions 62 of the first and second expansion bolts 56 and 58 are aligned with and inserted into corresponding bolt holes 64 of the first and second flanges 40 and 42, respectively. The user then expands the expandable portions 62 of the first and second expansion bolts 56 and 58 to securely couple them within the respective bolt holes 64 by friction between the expansion bolt 56 or 58 and an inner surface 66 of the corresponding bolt hole 64. FIG. 3 illustrates four actuator assemblies 12 removably coupled to a process equipment bolt flange joint 38, wherein the process equipment, including bolt flange joint 38, is shown in dashed lines, and the four actuator assemblies 12 are shown in solid lines.

Figure 8:
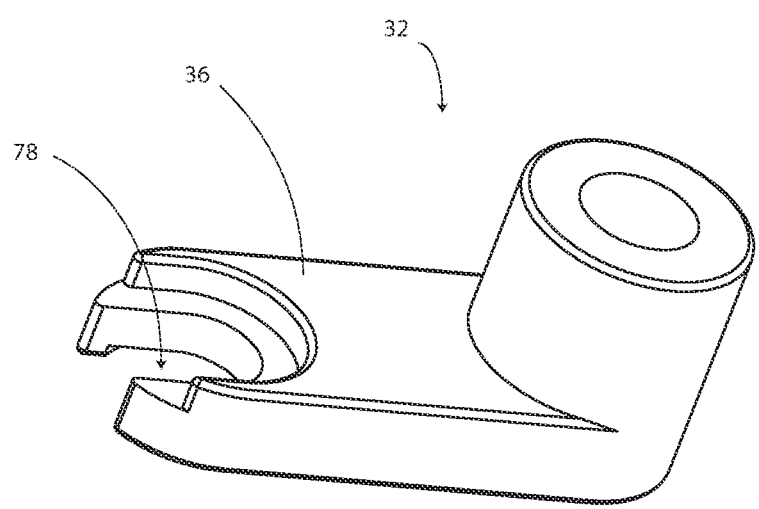
FIG. 8 is a perspective view of a second open-slot clamping member of an actuator assembly of a system for remotely opening and closing a process equipment bolt flange joint, according to an embodiment.
Figure 9:
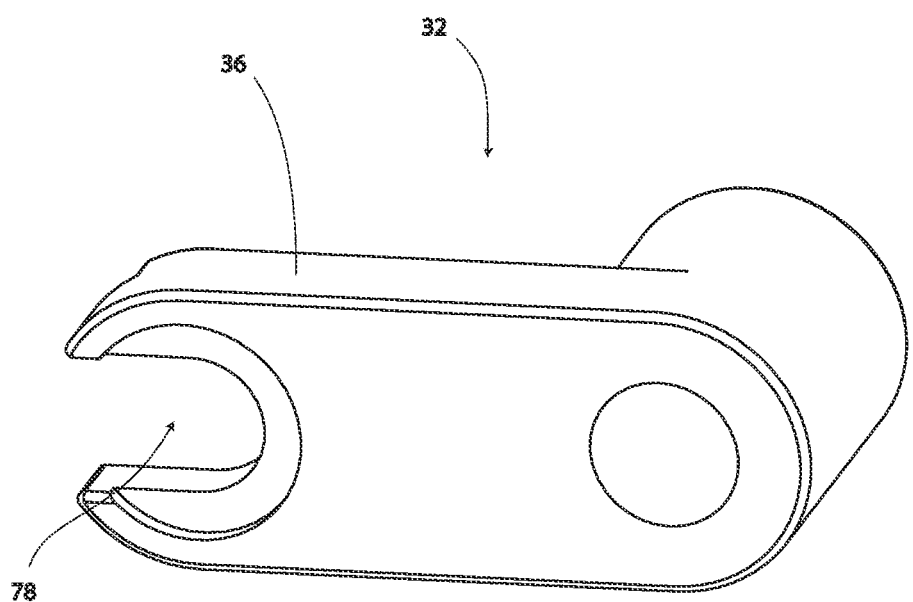
FIG. 9 is another perspective view of a second open-slot clamping member of an actuator assembly of a system for remotely opening and closing a process equipment bolt flange joint, according to the embodiment of FIG. 8.
Figure 10:
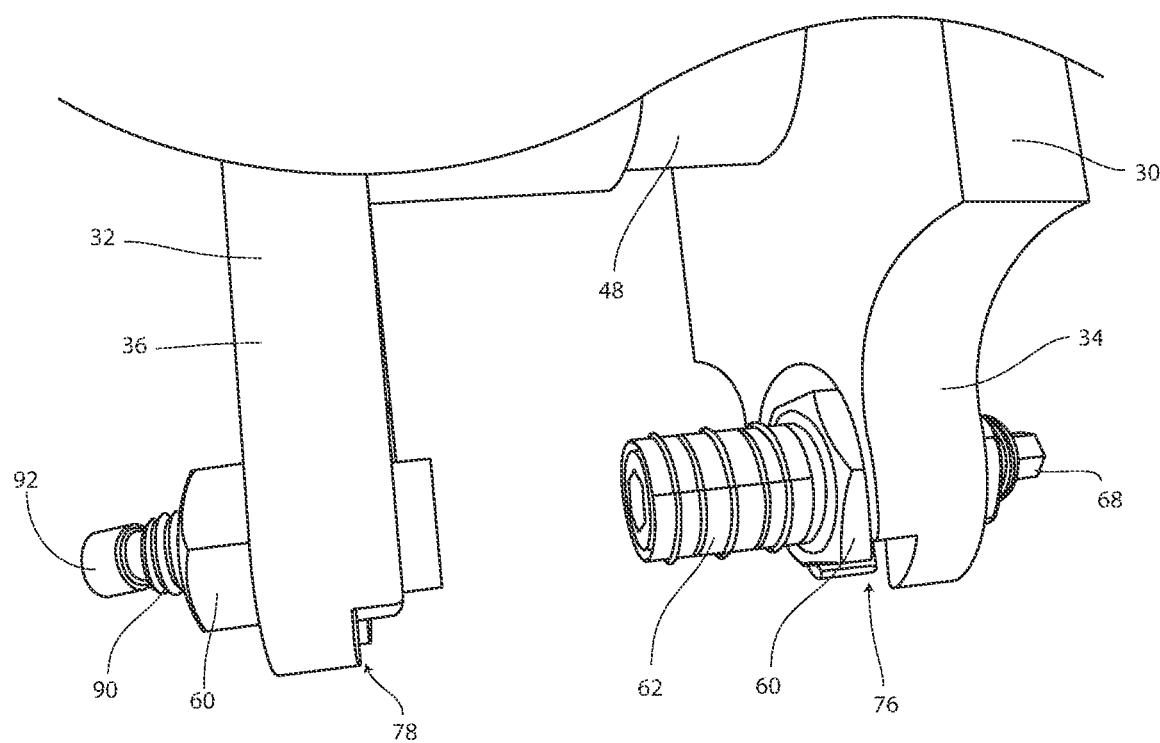
FIG. 10 is a partial perspective view of first and second open-slot clamping members of an actuator assembly of a system for remotely opening and closing a process equipment bolt flange joint, according to an embodiment.

Referring to FIGS. 8-10, In some embodiments, each of the first and second jaw portions 34 and 36 may comprise a first expansion bolt open slot 76 and second expansion bolt open slot 78, respectively, instead of the first and second expansion bolt apertures 52 and 54 described above. In such embodiments, in order to couple the actuator assembly 12 to the flange joint 38, a user may first couple the first and second expansion bolts 56 and 58 securely within the corresponding bolt holes 64 of the first and second flanges 40 and 42. Then, the user may slide the first and second jaw portions 34 and 36 of the actuator assembly 12 over the corresponding first and second flanges 40 and 42, wherein the first and second expansion bolt open slots 76 and 78 slide around the first and second expansion bolts 56 and 58, respectively, wherein the expansion bolts 56 and 58 extend through the corresponding slots 76 and 78. The user may then secure the jaw portions 34 and 36 to the respective expansion bolts 56 and 58 by nuts 60.

Figure 7:
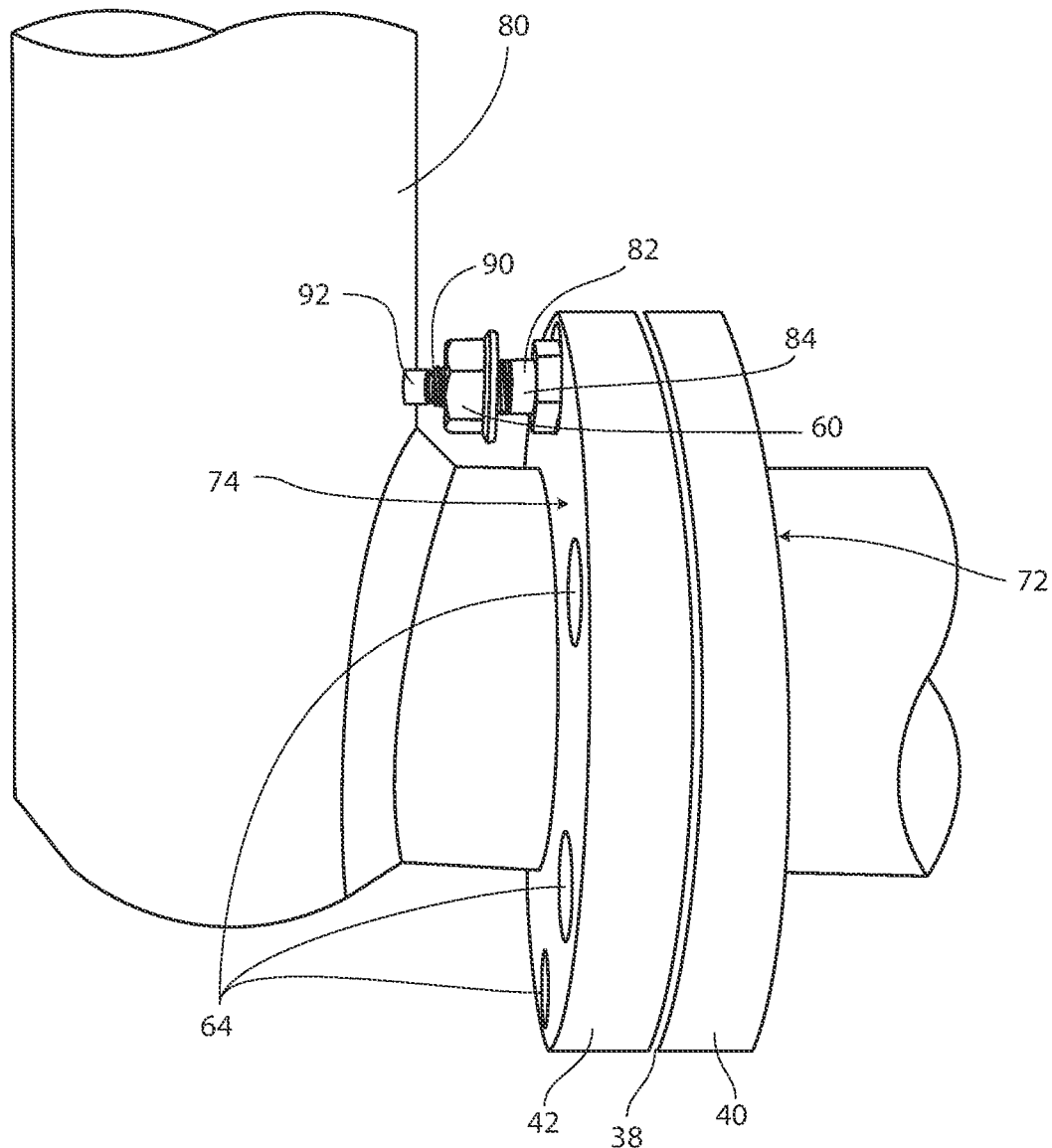
FIG. 7 is a perspective view of a swivel tip contact bolt of a system for remotely opening and closing a process equipment bolt flange joint coupled between a process equipment bolt flange joint and an interfering component, according to an embodiment.

It is an advantage of an actuator assembly 12 of the present invention, that it may be configured to fit over a bolt flange joint 38 in a tight space, such as in close proximity to other equipment, for example. As shown in FIG. 7, in some applications, a process equipment bolt flange joint 38 may be located in close proximity to other interfering process equipment components 80, such as another bolt flange joint, another pipe, a cross pipe of an elbow or T-coupler, and the like, for example. It may be difficult or impossible to expand an expansion bolt 56 or 58 for coupling within a bolt hole 64 of the flange joint 38 because the interfering component 80 is in the way. In such cases, a contact bolt 82, such as a swivel-tip contact bolt 82, for example, may be used in place of the expansion bolt 56 or 58. As shown, the swivel-tip contact bolt 82 may comprise a main body 84 having a first end 86 partially inserted into the bolt hole 64 of the flange joint 38. The opposing end 88 may comprise a threaded insert 90 that is expandable and contractable by threading the insert 90 into or out of the main body 84, thereby extending or shortening the overall length of the swivel-tip contact bolt 82. The insert 90 may be extended out from the main body 84, by threading it outward, until it comes into contact with and is tightened against the interfering component 80, thereby securing the first end 86 within the bolt hole 64. The second end 88 may comprise a swivel tip 92 to accommodate engagement of the interfering component 80 at various angles and to avoid damage to the interfering component 80 from the contact bolt 82. A jaw portion 34 or 36 of the actuator assembly 12, having an expansion bolt open slot 76 or 78, may then be slid onto the contact bolt 82, and secured thereto in a similar manner as described above with an expansion bolt 56 or 58.

Figure 11:
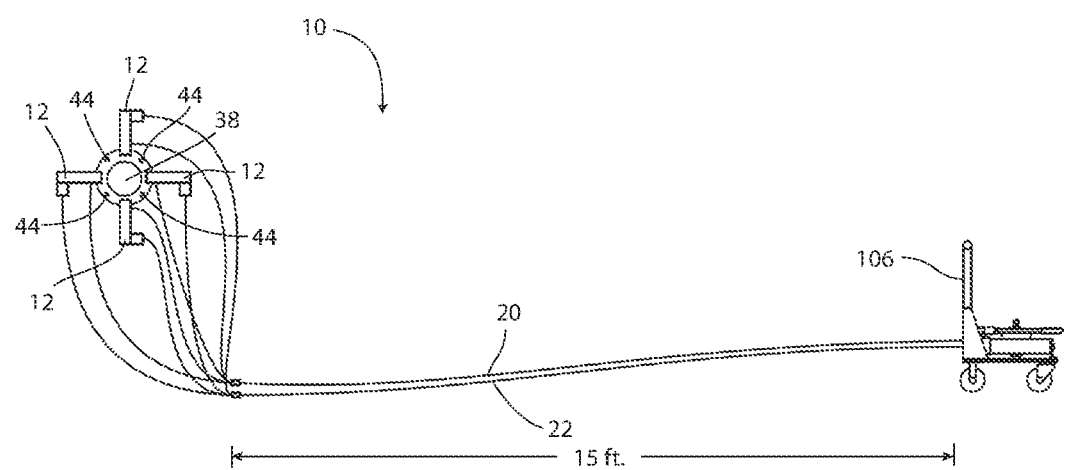
FIG. 11 is a perspective view of a system for remotely opening and closing a process equipment bolt flange joint coupled to a process equipment bolt flange joint, according to an embodiment.

As stated above, for practical applications, embodiments of the system 10 may comprise a plurality of actuator assemblies 12. The number of actuator assemblies 12 may be dependent on the number of bolts 44 in the bolt flange joint 38. For example, if the flange joint 38 comprises eight or twelve bolts 44, then it may be appropriate to use a system 10 with 4 actuator assemblies 12, wherein the 4 actuator assemblies 12 are coupled to and equally-spaced about the flange joint 38, as shown in FIGS. 3 and 11. If the flange joint 38 comprises eight bolts 44, then every other bolt 44 may be removed, and an actuator assembly 12 coupled to the flange joint 38 in its stead; if the flange joint 38 comprises twelve bolts 44, then an actuator assembly 12 may be coupled in the location of every third bolt 44; and so on. Although this is not a limiting requirement, by spacing multiple actuator assemblies 12 evenly-spaced around the flange joint 38, even pressure is assured when opening and closing the flange joint 38. Although the system 10 shown in the drawings, and described herein, may comprise four actuator assemblies 12, this is not intended to be limiting. It is understood that any number of actuator assemblies 12 may be used without departing from the scope of the present invention.

Figure 12:
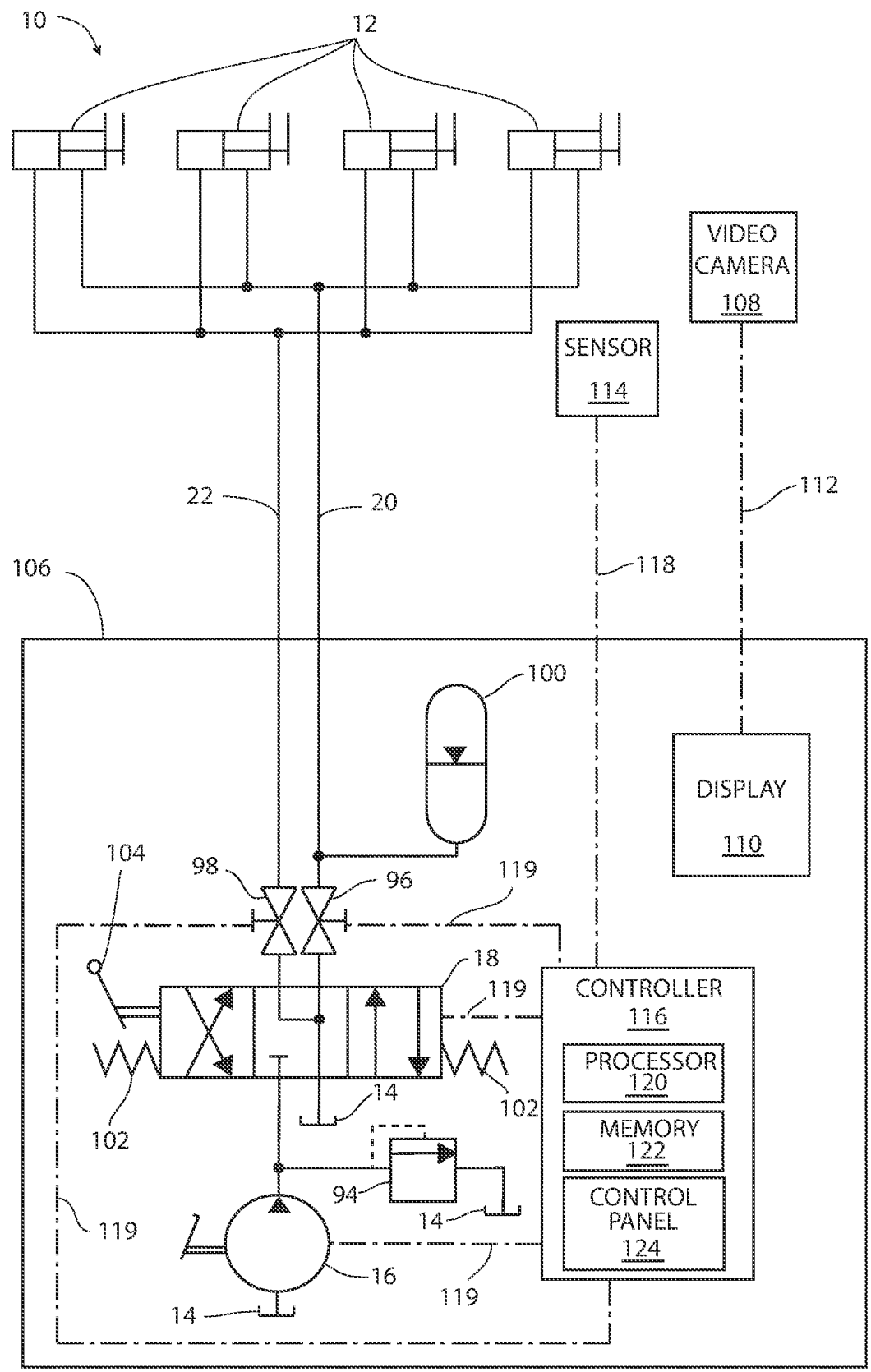
FIG. 12 is a diagrammatic view of a system for remotely opening and closing a process equipment bolt flange joint, according to an alternative embodiment.

As shown in FIGS. 1 and 12, embodiments of a system 10 may further comprise a pressure relief valve 94 coupled between the pump 16 and the control valve 18, and in fluid communication with the fluid reservoir 14. In cases in which hydraulic pressure between the pump 16 and the control valve 18 exceeds a predetermined limit, the pressure relief valve 94 is opened by the high-pressure hydraulic fluid, allowing some of the hydraulic fluid to flow through the pressure relief valve 94 to the fluid reservoir 14, thus relieving the excess pressure in the system 10. It is contemplated that a system 10 may comprise other pressure relief valves 94 coupled thereto at other appropriate locations for preventing build-up of excessive hydraulic pressure in the system 10.

Again referring to FIGS. 1 and 12, some embodiments may further comprise a closing side shut-off valve 96 coupled to the closing side hydraulic line 20 between the control valve 18 and the closing side 28 of the double-acting piston cylinder 24, wherein the closing side shut-off valve 96 is changeable between an open position, in which hydraulic fluid is flowable through the closing side shut-off valve 96 and a closed position, in which hydraulic fluid is prevented from flowing through the closing side shut-off valve 96; and an opening side shut-off valve 98 coupled to the opening side hydraulic line 22 between the control valve 18 and the opening side 26 of the double-acting piston cylinder 24, wherein the opening side shut-off valve 98 is changeable between an open position, in which hydraulic fluid is flowable through the opening side shut-off valve 98, and a closed position, in which hydraulic fluid is prevented from flowing through the opening side shut-off valve 98. In some embodiments, each of the closing side shut-off valve 96 and the opening side shut-off valve 98 may be manual shut-off valves that are operable by hand by the user.

In operation, a user may open the closing side shut-off valve 96 and the opening side shut-off valve 98. With the control valve 18 in the closing side position, the user may then operate the pump 16 to pump hydraulic fluid into the opening side 26 of the piston cylinder 24 of the at least one actuator assembly 12, thereby applying closing pressure between the first and second jaw portions 34 and 36 thereof to close, and/or hold closed, the bolt flange joint 38. In some embodiments, for example, a closing force of about 20,000 lbs may be achieved. The closing side shut-off valve 96 may then be closed in order to lock the at least one actuator assembly 12 into the closed position by maintaining the hydraulic pressure within the closing side 28 of the piston cylinder 24. In reverse operation, with the closing side shut-off valve 96 open again, and the control valve 18 in the opening side position, the user may then operate the pump 16 to pump hydraulic fluid into the opening side 26 of the piston cylinder 24 of the at least one actuator assembly 12, thereby applying opening pressure to open the bolt flange joint 38. The opening side shut-off valve 98 may then be closed in order to lock the at least one actuator assembly 12 into the open position by maintaining the hydraulic pressure within the opening side 26 of the piston cylinder 24.

As shown in FIGS. 1 and 12, some embodiments may further comprise an accumulator 100 in fluid communication with the closing side hydraulic line 20 at a location between the closing side shut-off valve 96 and the closing side 28 of the double-acting piston cylinder 24. In such embodiments, the control valve 18 may be further changeable to, and biased toward, a neutral position, in which hydraulic fluid is flowable between the fluid reservoir 14 and each of the closing side hydraulic line 20 and the opening side hydraulic line 22. For example, the control valve 18 may be a 4-way 3-position manual control valve 18, wherein the control valve 18 is changeable between a closing position, in which hydraulic fluid is flowable between the pump 16 and the closing side hydraulic line 20; a neutral position, in which hydraulic fluid is flowable between the fluid reservoir 14 and each of the closing side hydraulic line 20 and the opening side hydraulic line 22; and an opening position, in which hydraulic fluid is flowable between the pump 16 and the opening side hydraulic line 22; wherein the valve is biased toward the neutral position, such as by at least one spring element 102 coupled thereto. In such embodiments, a user may change the control valve 18 to the closing position, by moving a control lever 104 of the control valve 18 in a first direction, and change the control valve 18 to the opening position, by moving the control lever 104 in a second direction. The control valve 18 may be changed to the neutral position by the user simply releasing the control lever 104, wherein the control valve 18 changes to the neutral position in response to a spring force of the at least one spring element 102 acting thereon.

In operation, a user may open the bolt flange joint 38, as described above, except by maintaining the closing side shut-off valve 96 closed while pumping hydraulic fluid into the opening side 26 of the piston cylinder 24, hydraulic fluid is expelled from the closing side 28 of the piston cylinder 24 into the accumulator 100, thereby building up energy within the accumulator 100, due to increased hydraulic pressure therein. If the user were to then release the control lever 104 of the control valve 18, the control valve 18 would be changed quickly to the neutral position, thereby putting the opening side 26 of the piston cylinder 24 in fluid communication with the fluid reservoir 14, releasing pressure within the opening side 26 of the piston cylinder 24. With the pressure released from the opening side 26 of the piston cylinder 24, and the closing side shut-off valve 96 still closed, the built-up energy in the accumulator 100 forces hydraulic fluid from the accumulator 100 into the closing side 28 of the piston cylinder 24, thereby closing the flange joint 38. This is an effective safety feature of embodiments of the present invention. In such embodiments, if the user desires to quickly close the flange joint 38, such as in situations where, upon opening the flange joint 38, a leak or other hazardous condition is detected, for example, the user may quickly release the control lever 104 (and may even run away from the location, i.e. "drop and run") to quickly close the flange joint 38 again with significant closing force.

As shown in FIGS. 1, 11, and 12, some embodiments may further comprise a mobile storage device 106 for storing, holding, and transporting components of the system 10. For example, the mobile storage device 106 may be a wheeled cart, a dolly, or the like, wherein components of the system 10 are coupled thereto. In some embodiments, the mobile storage device 106 may be configured to hold all of the components of the system 10 for convenient storage, and/or transport, of the system 10 while not in use.

It is an advantage of some embodiments of a system 10 of the present invention that the at least one actuator assembly 12 may be operated remotely in response to operation of the hydraulic pump 16 manually by a user without the need for electronics or electrical components that may pose a spark or ignition source hazard in proximity to a bolt flange joint 38 or require obtaining a hot work permit for using such components in proximity to a bolt flange joint 38. The closing and opening side hydraulic fluid lines 20 and 22 may be of sufficient length as to allow the bolt flange joint 38 to be disposed remotely from other components coupled to, or otherwise stored on, the mobile storage device 106. For example, as shown in FIG. 11, in some embodiments, the closing and opening side hydraulic fluid lines 20 and 22 may each be at least 15 feet in length, so as to allow the mobile storage device 106 to be located at least 15 feet away from the bolt flange joint 38. It is understood that the mobile storage device 106 may be located any predetermined distance from the bolt flange joint 38, determined to be a safe distance according to the circumstances and suitable for remote operation of an actuator assembly 12 in response to operation of other components of the system 10. This allows the user to operate the pump 16, the control valve 18, the shut-off valves 96 and 98, and any other relevant control components, remotely from the process equipment bolt flange joint 38 as a safety precaution, thereby minimizing or eliminating risk of significant injury or death to the user, such as from fire, explosion, pressurized blast, or contact with toxic, burning, or freezing liquids and/or gases escaping the bolt flange joint 38.

Referring to FIG. 12, some embodiments may further include a video camera 108 and a display 110 coupled to the video camera 108 via communication link 112. It is understood that communication link 112 may be wired or wireless. The video camera 108 may be located proximate the bolt flange joint 38, so as to capture video of the bolt flange joint 38 while it is being opened and/or closed by the user. The user may view the video remotely displayed on the display 110, which may be located on or near the mobile storage device 106, or otherwise disposed within view of the user. In this way, the user may be able to detect a discharge or other hazardous condition at the bolt flange joint 38, prompting the user to "drop and run", as described above, to quickly close the joint 38. In cases where there is no emergency, and by viewing the display 110 to determine it is safe to perform service on an opened flange joint 38, a user may lock the hydraulic fluid in the system 10, with the bolt flange joint 38 in an open position, such as by closing the opening side shut-off valve 98, and/or the user may block out the flange joint 38, thereby preventing the flange joint 38 from being closed while the joint 38 is being serviced, as a safety precaution.

In some embodiments, a hydraulic pump 16, of the present invention, may be a manual hand pump, or a manual foot pump. However, this is not intended to be limiting. A hydraulic pump 16, of the present invention, may be any hydraulic pump 16 suitable for remote operation of a hydraulic cylinder 24.

Again referring to FIG. 12, in some embodiments, a system 10 may further comprise a feedback control loop comprising any of a variety of sensors 114, or combinations thereof, located at or near the flange joint 38 with a controller 116 coupled thereto by communication line 118. The controller 116 may be further coupled to any controllable components of the system 10, such as the hydraulic pump 16, the control valve 18, and/or the shut-off valves, wherein such components may be controllable by a controller 116. Such coupling may be wired or wireless. The controller 116 may comprise a processor 120, a memory 122, and a control panel 124. The controller 116 may be disposed remotely from the flange joint 38. In some embodiments, the controller 116 may be coupled to the mobile storage device 106. A sensor 114 may be any of a variety of sensors for sensing a condition of or near the flange joint 38. For example, a sensor 114 may be a temperature sensor, a sound sensor, a break beam sensor, a vibration sensor, a VOC (volatile organic compound) sensor, or the like, for sensing a condition of or at the flange joint 38, such as a temperature, a vibration, sound, a presence of material in the pipe system or leaking or being expelled from the piping system, or any other condition of or at the flange joint 38 that may be determined by a sensor 114.

As shown in FIGS. 12, various components of the system 10 may be controllable by the controller 116, wherein the controllable components may operate to open or close the flange joint 38 in response to signals received from the controller 116, via communication links 119. The controller 116 may be programmed to receive a signal from the at least one sensor 114, wherein the signal contains information related to a condition at or near the flange joint 38, and to send a signal to controllable components of the system 10 in response to the signal received from the at least one sensor. For example, the at least one sensor 114 may be a temperature sensor disposed proximate the bolt flange joint 38. In the case of a leak from the joint 38 while the joint 38 is being opened, wherein the temperature of the leaking material is higher than a predetermined temperature, the temperature sensor 114 may send a signal, containing temperature information regarding the temperature of the leaking material, to the controller 116, via communication link 118. In response to receiving the signal, the controller 116 may be programmed to control the closing and opening side shut-off valves 96 and 98 and the control valve 18 to ensure the closing side shut-off valve 96 is in the closed position, the opening side shut-off valve 98 is in the open position, and the control valve 18 is moved to the neutral position, thereby causing the bolt flange joint 38 to close in response to pressure from the accumulator 100 forcing hydraulic fluid into the opening side 26 of the double-acting piston cylinder 24, by communicating with these controllable components via communication links 119. It is understood that communication links 118 and 119 may be wired or wireless communication links.

In some embodiments, the controller 116 may be programmed to operate the controllable components to open and/or close the flange joint 38 according to a predetermined pattern. For example, the controller 116 may cause the flange joint 38 to open slightly at first. Then, upon sensing a dangerous condition of or at the flange joint 38, the controller 116 may cause the flange joint 38 to close again. In another example, upon sensing a safe condition of or at the flange joint 38, the controller 116 may cause the flange joint 38 to continue to open slowly. In another example, upon sensing a condition of or at the flange joint 38, the controller 116 may cause the flange joint 38 to slightly open and close repeatedly, in succession, such as to titrate off pressure in the piping system until the flange joint 38 can be safely opened fully. The controller 116 may be programmed to adjust the pattern of opening and closing the flange joint 38 in response to continuous feedback from the at least one sensor 114. The controller 116 may be programmed to control the hydraulic pump 16 to open and/or close the flange joint 38 according to any conceivable programmable pattern. In some embodiments, a user may use the controller 116 to control the controllable components in response to user input to the control panel 124 of the controller 116.

In addition to advantages of a system 10, of the present invention, mentioned above, other advantages may include: that the system 10 is capable of handling multiple pipe and bolt dimensions and torque requirements by sizing components of the system 10 accordingly; that the system 10 may be operated remotely (such as from a minimum distance of 15 feet, or other predetermined distance, from a flange joint 38) by as few as only one or two people; that the inner mating faces of the flanges 40 and 42 of a flange joint 38 are not marred or otherwise damaged when spreading the flanges (as may be the case when using a conventional wedge or other conventional tools to spread the flanges, for example) because the actuator assembly 12 may be coupled to the inner surfaces 66 of bolt holes 64 of the flanges 40 and 42 by expansion bolts 56 and 58 without contacting the inner mating faces of the flanges 40 and 42; and that the system 10 may be used in extreme temperature environments, such as, without limitation, in temperature ranges from less than zero degrees Fahrenheit up to 800 degrees Fahrenheit, for example, by forming components of the system 10 of materials capable of withstanding such temperature extremes. Furthermore, use of a system 10, of the present invention, may greatly reduce or eliminate potential release of harmful materials (such as toxic gas, flammables, oil, etc.) or spills, or lost productivity in additional equipment preparation, and catastrophic release of large quantities of toxic or flammable materials with fire or explosion potential; may result in significant cost savings due to reduction in lost productivity for additional clearing and/or cleaning of equipment, clean-up of spills, cost of additional personal protection equipment for workers (such as breathing air, slicker suits, standbys, etc.); may greatly reduce or eliminate loss of life, and millions of dollars in repairs, from incidents related to opening bolt flange joints of process equipment; may mitigate incidents by closing process equipment to reduce exposure to flow and residual activity and mitigate the need for a response (such as closure of plant facilities).

Figure 13:
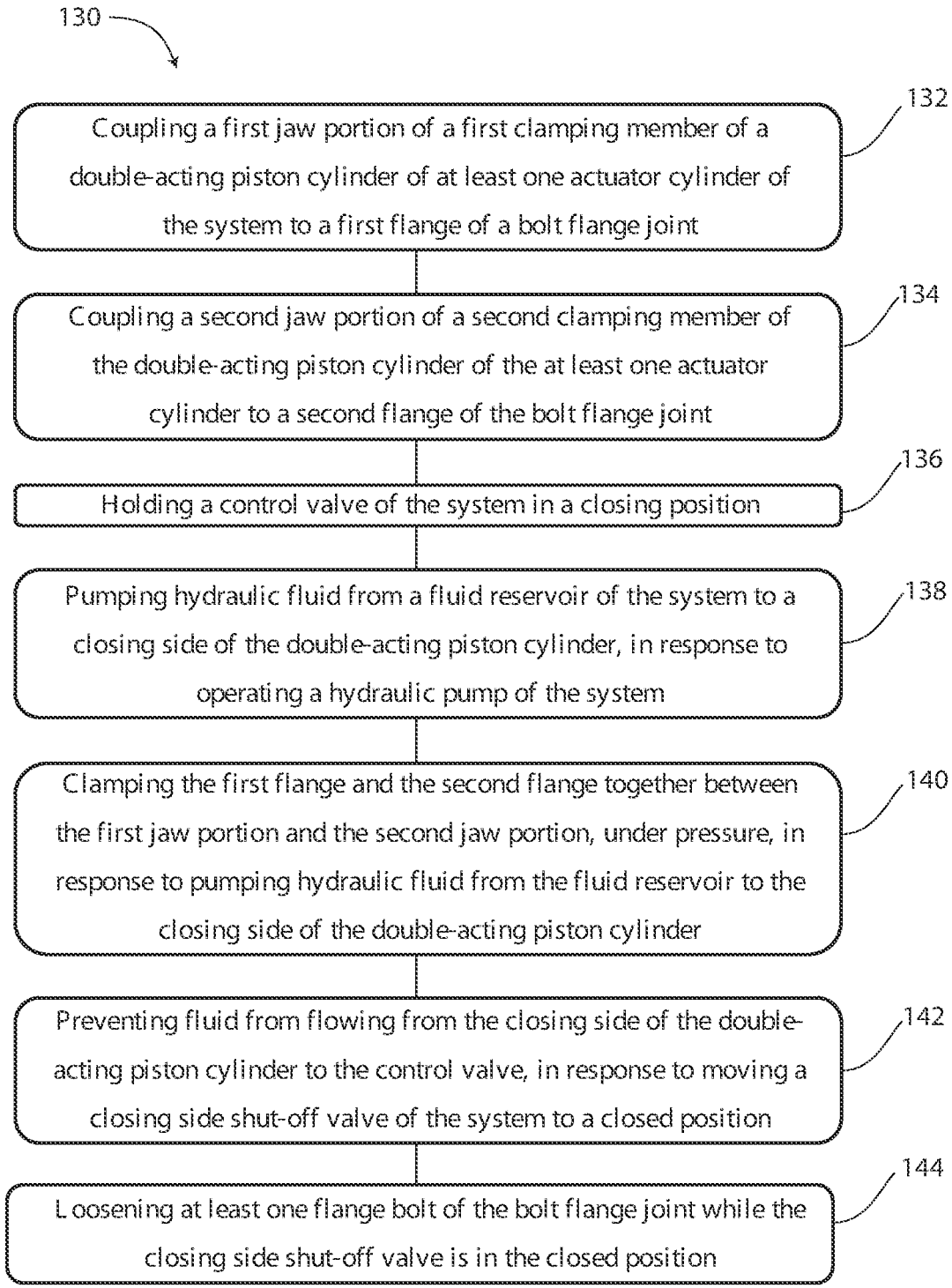
FIG. 13 is a block diagram of steps of a method of using a system for remotely opening and closing a process equipment bolt flange joint, according to an embodiment.

A method 130 of using a process equipment bolt flange joint opening and closing system 10 is disclosed. FIG. 13 is a block diagram of steps of the method 130. Embodiments of the method 130 may comprise coupling a first jaw portion of a first clamping member of a double-acting piston cylinder of at least one actuator cylinder of the system to a first flange of a bolt flange joint [Step 132]; coupling a second jaw portion of a second clamping member of the double-acting piston cylinder of the at least one actuator cylinder to a second flange of the bolt flange joint [Step 134]; holding a control valve of the system in a closing position [Step 136]; pumping hydraulic fluid from a fluid reservoir of the system to a closing side of the double-acting piston cylinder, in response to operating a hydraulic pump of the system [Step 138]; and clamping the first flange and the second flange together between the first jaw portion and the second jaw portion, under pressure, in response to pumping hydraulic fluid from the fluid reservoir to the closing side of the double-acting piston cylinder [Step 140].

The method 130, as shown in FIG. 13, may further comprise preventing fluid from flowing from the closing side of the double-acting piston cylinder to the control valve, in response to moving a closing side shut-off valve of the system to a closed position [Step 142]; and loosening at least one flange bolt of the bolt flange joint while the closing side shut-off valve is in the closed position [Step 144].

Figure 14:
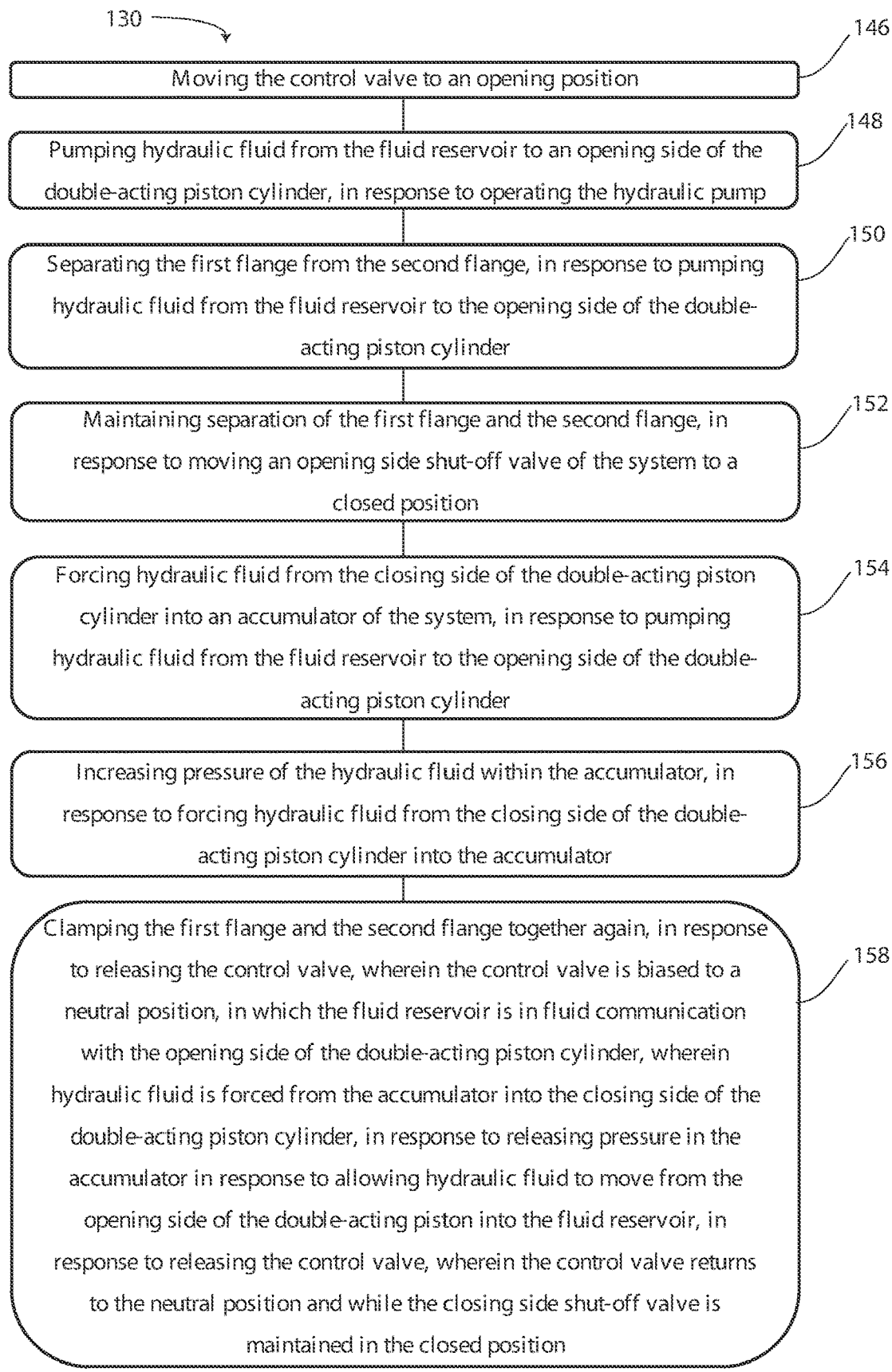
FIG. 14 is a block diagram of additional steps of a method of using a system for remotely opening and closing a process equipment bolt flange joint, according to an embodiment.

FIG. 14, is a block diagram of additional steps of the method 130, which may further comprise moving the control valve to an opening position [Step 146]; pumping hydraulic fluid from the fluid reservoir to an opening side of the double-acting piston cylinder, in response to operating the hydraulic pump [Step 148]; and separating the first flange from the second flange, in response to pumping hydraulic fluid from the fluid reservoir to the opening side of the double-acting piston cylinder [Step 150].

The method 130, as shown in FIG. 14, may further comprise maintaining separation of the first flange and the second flange, in response to moving an opening side shut-off valve of the system to a closed position [Step 152].

The method 130, as shown in FIG. 14, may further comprise forcing hydraulic fluid from the closing side of the double-acting piston cylinder into an accumulator of the system, in response to pumping hydraulic fluid from the fluid reservoir to the opening side of the double-acting piston cylinder [Step 154]; increasing pressure of the hydraulic fluid within the accumulator, in response to forcing hydraulic fluid from the closing side of the double-acting piston cylinder into the accumulator [Step 156]; and clamping the first flange and the second flange together again, in response to releasing the control valve, wherein the control valve is biased to a neutral position, in which the fluid reservoir is in fluid communication with the opening side of the double-acting piston cylinder, wherein hydraulic fluid is forced from the accumulator into the closing side of the double-acting piston cylinder, in response to releasing pressure in the accumulator in response to allowing hydraulic fluid to move from the opening side of the double-acting piston into the fluid reservoir, in response to releasing the control valve, wherein the control valve returns to the neutral position and while the closing side shut-off valve is maintained in the closed position [Step 158].

Figure 15:
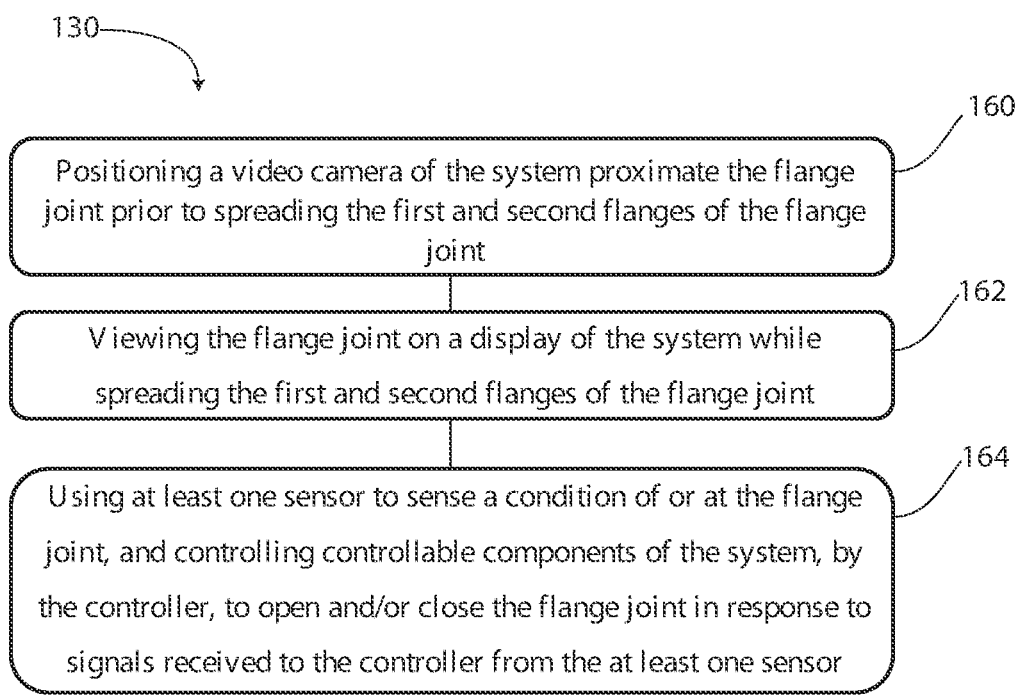
FIG. 15 is a block diagram of more additional steps of a method of using a system for remotely opening and closing a process equipment bolt flange joint, according to an embodiment.

In some embodiments, the method 130, as shown in FIG. 15, may further comprise positioning a video camera of the system proximate the flange joint prior to spreading the first and second flanges of the flange joint [Step 160]; and viewing the flange joint on a display of the system while spreading the first and second flanges of the flange joint [Step 162].

In some embodiments, as shown in FIG. 15, the method 130 may further comprise using at least one sensor to sense a condition of or at the flange joint, and controlling controllable components of the system, by the controller, to open and/or close the flange joint in response to signals received to the controller from the at least one sensor [Step 164].

The components defining any system for remotely opening and closing a bolt flange joint may be formed of any of many different types of materials or combinations thereof that can readily be formed into shaped objects provided that the components selected are consistent with the intended operation of a system for remotely opening and closing a bolt flange joint. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as copper, zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any system for remotely opening and closing a bolt flange joint may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, sewing, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A process equipment bolt flange joint opening and closing system, comprising:
    at least one actuator assembly, comprising:
        a double acting piston cylinder;
        a first clamping member coupled to the double acting piston cylinder at a rod end thereof;
        a second clamping member coupled to a protruding end of a rod of the double acting piston cylinder, wherein the first clamping member comprises a first jaw portion extending in a radial direction from a longitudinal axis of the rod and the second clamping member comprises a second jaw portion extending in a radial direction from the longitudinal axis of the rod, wherein the first and second clamping members correspond to each other, wherein the first jaw portion and the second jaw portion are configured to engage and to be coupled to a first flange and a second flange of a bolt flange joint, respectively;
    a fluid reservoir;
    a hydraulic pump in fluid communication with the fluid reservoir;
    a control valve in fluid communication with the hydraulic pump and also in fluid communication with the fluid reservoir;
    a closing side hydraulic line coupled between and in fluid communication with the control valve and a closing side of the double acting piston cylinder of the at least one actuator assembly;
    an opening side hydraulic line coupled between and in fluid communication with the control valve and an opening side of the double acting piston cylinder of the at least one actuator assembly, wherein the control valve is changeable between a closing position, in which hydraulic fluid is flowable between the pump and the closing side hydraulic line, and an opening position, in which hydraulic fluid is flowable between the pump and the opening side hydraulic line;
    a closing side shut-off valve coupled to the closing side hydraulic line between the control valve and the closing side of the double acting piston cylinder, wherein the closing side shut-off valve is changeable between an open position, in which hydraulic fluid is flowable through the closing side shut-off valve and a closed position, in which hydraulic fluid is prevented from flowing through the closing side shut-off valve;
    an opening side shut-off valve coupled to the opening side hydraulic line between the control valve and the opening side of the double acting piston cylinder, wherein the opening side shut-off valve is changeable between an open position, in which hydraulic fluid is flowable through the opening side shut-off valve, and a closed position, in which hydraulic fluid is prevented from flowing through the opening side shut-off valve; and
    an accumulator in fluid communication with the closing side hydraulic line at a location between the closing side shut-off valve and the closing side of the double acting piston cylinder, wherein the control valve is further changeable to, and biased toward, a neutral position, in which hydraulic fluid is flowable between the fluid reservoir and each of the closing side hydraulic line and the opening side hydraulic line.

2. The system of claim 1, further comprising:
    a first expansion bolt aperture through the first jaw portion;
    a second expansion bolt aperture through the second jaw portion, wherein longitudinal axes of the first and second expansion bolt apertures are colinear and are parallel to a longitudinal axis of the rod;
    a first expansion bolt coupled through the first expansion bolt aperture, the first expansion bolt comprising a first expandable portion extending from the first jaw portion toward the second jaw portion, wherein the first expandable portion is configured to be coupled within a bolt hole of the first flange by friction between the first expandable portion and an interior surface of the bolt hole of the first flange;
    a second expansion bolt coupled through the second expansion bolt aperture, the second expansion bolt comprising a second expandable portion extending from the second jaw portion toward the first jaw portion, wherein the second expandable portion is configured to be coupled within a bolt hole of the second flange by friction between the second expandable portion and an interior surface of the bolt hole of the second flange.

3. The system of claim 2, further comprising:

an accumulator in fluid communication with the closing side hydraulic line at a location between the closing side shut-off valve and the closing side of the double acting piston cylinder.

4. The system of claim 1, further comprising:

a first expansion bolt comprising a first expandable portion configured to be coupled within a bolt hole of the first flange by friction between the first expandable portion and an interior surface of the bolt hole of the first flange;

a second expansion bolt comprising a second expandable portion configured to be coupled within a bolt hole of the second flange by friction between the second expandable portion and an interior surface of the bolt hole of the second flange;

a first expansion bolt slot in the first jaw portion, wherein the first jaw portion is configured to be coupled to the first flange when the first expansion bolt is coupled within the bolt hole of the first flange, by sliding the first jaw portion onto the first flange, wherein the first expansion bolt extends through the first expansion bolt slot, in a direction away from the second jaw portion, and is secured thereto by a first nut;

a second expansion bolt slot in the second jaw portion, wherein the second jaw portion is configured to be coupled to the second flange when the second expansion bolt is coupled within the bolt hole of the second flange, by sliding the second jaw portion onto the second flange, wherein the second expansion bolt extends through the second expansion bolt slot, in a direction away from the first jaw portion, and is secured thereto by a second nut.

5. The system of claim 4, further comprising:

an accumulator in fluid communication with the closing side hydraulic line at a location between the closing side shut-off valve and the closing side of the double acting piston cylinder.

6. The system of claim 5, further comprising:

at least one sensor configured to sense a condition of the bolt flange joint; and a controller communicatively coupled to the at least one sensor and communicatively coupled to at least one controllable component of the system selected from the group consisting of the hydraulic pump, the control valve, the closing side shut-off valve, the opening side shut-off valve, and any combination thereof, the controller comprising:

a memory; and a processor, wherein operation of the at least one controllable component is controlled by the controller in response to a signal received by the controller from the at least one sensor.

7. The system of claim 4, wherein the first expansion bolt further comprises a swivel tip coupled to an end of the first expansion bolt opposite the first expandable portion, wherein the swivel tip is changeable between a retracted position and an extended position by threading the swivel tip into or out of a threaded aperture in a main body of the first expansion bolt, wherein the swivel tip is configured to engage a surface of a portion of a pipe system proximate the bolt flange joint when the first expansion bolt is coupled within the bolt hole of the first flange.

8. The system of claim 7, further comprising:

an accumulator in fluid communication with the closing side hydraulic line at a location between the closing side shut-off valve and the closing side of the double acting piston cylinder.

9. A method of using a process equipment bolt flange joint opening and closing system, the method comprising:

coupling a first jaw portion of a first clamping member of a double acting piston cylinder of at least one actuator cylinder of the system to a first flange of a bolt flange joint;

coupling a second jaw portion of a second clamping member of the double acting piston cylinder of the at least one actuator cylinder to a second flange of the bolt flange joint;

holding a control valve of the system in a closing position;

pumping hydraulic fluid from a fluid reservoir of the system to a closing side of the double acting piston cylinder, in response to operating a hydraulic pump of the system; and clamping the first flange and the second flange together between the first jaw portion and the second jaw portion, under pressure, in response to pumping hydraulic fluid from the fluid reservoir to the closing side of the double acting piston cylinder;

preventing fluid from flowing from the closing side of the double acting piston cylinder to the control valve, in response to moving a closing side shut-off valve of the system to a closed position; and loosening at least one flange bolt of the bolt flange joint while the closing side shut-off valve is in the closed position;

moving the control valve to an opening position;

pumping hydraulic fluid from the fluid reservoir to an opening side of the double acting piston cylinder, in response to operating the hydraulic pump;

separating the first flange from the second flange, in response to pumping hydraulic fluid from the fluid reservoir to the opening side of the double acting piston cylinder;

forcing hydraulic fluid from the closing side of the double acting piston cylinder into an accumulator of the system, in response to pumping hydraulic fluid from the fluid reservoir to the opening side of the double acting piston cylinder;

increasing pressure of the hydraulic fluid within the accumulator, in response to forcing hydraulic fluid from the closing side of the double acting piston cylinder into the accumulator; and clamping the first flange and the second flange together again, in response to releasing the control valve, wherein the control valve is biased to a neutral position, in which the fluid reservoir is in fluid communication with the opening side of the double acting piston cylinder, wherein hydraulic fluid is forced from the accumulator into the closing side of the double acting piston cylinder, in response to releasing pressure in the accumulator in response to allowing hydraulic fluid to move from the opening side of the double acting piston into the fluid reservoir, in response to releasing the control valve, wherein the control valve returns to the neutral position and while the closing side shut-off valve is maintained in the closed position.

10. The method of claim 9, further comprising:

maintaining separation of the first flange and the second flange, in response to moving an opening side shut-off valve of the system to a closed position.

11. The method of claim 9, further comprising:
sensing a condition of the bolt flange joint by at least one sensor disposed proximate the bolt flange joint;
controlling a controllable component selected from the group consisting of the hydraulic pump, the control valve, the closing side shut-off valve, the opening side shut-off valve, and any combination thereof, by a controller coupled thereto and coupled to the at least one sensor, in response to receiving a condition signal from the at least one sensor to the controller.

12. A method of using a process equipment bolt flange joint opening and closing system, the method comprising:
coupling a first jaw portion of a first clamping member of a double acting piston cylinder of at least one actuator cylinder of the system to a first flange of a bolt flange joint;
coupling a second jaw portion of a second clamping member of the double acting piston cylinder of the at least one actuator cylinder to a second flange of the bolt flange joint;
moving a control valve of the system to an opening position;
pumping hydraulic fluid from a fluid reservoir of the system to an opening side of the double acting piston cylinder, in response to operating the hydraulic pump;
separating the first flange from the second flange, in response to pumping hydraulic fluid from the fluid reservoir to the opening side of the double acting piston cylinder;
forcing hydraulic fluid from the closing side of the double acting piston cylinder into an accumulator of the system, in response to pumping hydraulic fluid from the fluid reservoir to the opening side of the double acting piston cylinder;
increasing pressure of the hydraulic fluid within the accumulator, in response to forcing hydraulic fluid from the closing side of the double acting piston cylinder into the accumulator; and
clamping the first flange and the second flange together again, in response to releasing the control valve, wherein the control valve is biased to a neutral position, in which the fluid reservoir is in fluid communication with the opening side of the double acting piston cylinder, wherein hydraulic fluid is forced from the accumulator into the closing side of the double acting piston cylinder, in response to releasing pressure in the accumulator in response to allowing hydraulic fluid to move from the opening side of the double acting piston into the fluid reservoir, in response to releasing the control valve, wherein the control valve returns to the neutral position and while the closing side shut-off valve is maintained in the closed position.

13. The method of claim 12, further comprising:
forcing hydraulic fluid from the closing side of the double acting piston cylinder into an accumulator of the system, in response to pumping hydraulic fluid from the fluid reservoir to the opening side of the double acting piston cylinder;
increasing pressure of the hydraulic fluid within the accumulator, in response to forcing hydraulic fluid from the closing side of the double acting piston cylinder into the accumulator; and
clamping the first flange and the second flange together again, in response to a controller of the system operating the control valve to move the control valve to a neutral position, in which the fluid reservoir is in fluid communication with the opening side of the double acting piston cylinder, wherein hydraulic fluid is forced from the accumulator into the closing side of the double acting piston cylinder, in response to releasing pressure in the accumulator in response to allowing hydraulic fluid to move from the opening side of the double acting piston into the fluid reservoir, in response to the controller operating the control valve to move the control valve to the neutral position while the closing side shut-off valve is maintained in the closed position, wherein the controller operates the control valve in response to receiving a signal from at least one sensor sensing a condition of the bolt flange joint.

14. The method of claim 13, wherein the at least one sensor is selected from the group of sensors consisting of a temperature sensor, a pressure sensor, a vibration sensor, a sound sensor, a moisture sensor, a gas sensor, a motion sensor, a break beam sensor, and any combination thereof.

* * * * *